United States Patent [19]

Kerr et al.

[11] Patent Number: 4,692,077
[45] Date of Patent: Sep. 8, 1987

[54] SELF-LOCKING NUT WITH ROCKING ANTI-REVERSING PIN

[76] Inventors: Jack R. Kerr, 15015, Arlington, Tex. 76015; Thomas V. Shelton, #6 Woodland Dr., Mansfield, Tex. 76014; Jerry L. Dunsmore, #5 Woodlands Dr., Mansfield, Tex. 76063

[21] Appl. No.: 814,904

[22] Filed: Dec. 30, 1985

[51] Int. Cl.$^4$ ............................................. F16B 39/30
[52] U.S. Cl. .................................. 411/206; 411/941; 10/86 A
[58] Field of Search ............... 411/292, 296, 329, 540, 411/541, 941, 951, 952, 205, 206; 10/86 A

[56] References Cited
U.S. PATENT DOCUMENTS 1,821,652  9/1931  Ladd ..................................... 411/941
2,008,274  7/1935  Dickerhoff, Jr. .................... 411/941
2,011,280  8/1935  Henriksen ........................... 10/86 A Primary Examiner—Gary L. Smith
Assistant Examiner—Neill Wilson
Attorney, Agent, or Firm—Hubbard, Thurman, Turner & Tucker

[57] ABSTRACT

A self-locking nut has an annular body, an axial threaded bore, and a hexagonal exterior periphery. A small bore is drilled through the body parallel to the threaded bore adjacent to an apex of two peripheral flat surfaces. An L-shaped locking pin has a base leg received in that small bore, and an interference leg projecting into the threaded bore for interference relation with a mating bolt. The distal end of the base leg is provided with an outwardly facing recess, and this distal end is retained within the nut body by cold flowing body material into that small bore and recess. The recess includes two abutment surfaces which are disposed in planes inclined away from a plane parallel to the base leg and perpendicular to a plane defined by the two pin legs. These abutment surfaces coact with the nut metal displaced into the recess to allow for rotation of the distal end of the base leg through an arc less than that required for the interference leg. Therefore the tortional stress on the base leg is minimized and a much stiffer material may be used to fabricate the locking pin for maintaining the anti-reversing force on the bolt.

13 Claims, 9 Drawing Figures

SELF-LOCKING NUT WITH ROCKING ANTI-REVERSING PIN

BACKGROUND AND SUMMARY OF THE INVENTION

This invention relates to a self-locking nut of the anti-reversing type which includes an anti-reversing pin for interference engagement with the threads of a mating bolt, and to a method for fabricating such self-locking nut.

This invention is concerned with self-locking nuts of a type which are suitable for use in the fabrication of structures such as microwave towers and highway structures. In the fabrication of such structures, it is desirable to use nuts and bolts which have a very effective protective coating to minimize deterioration due to rust, corrosion, etc.

A very effective protective coating for steel nuts and bolts is referred to as "hot dip galvanized"; and one characteristic of this protective coating is that the thickness of the coating is not uniform. With that characteristic, many known types of lock nuts may not be used effectively, since where the hot dip coating is particularly thick, the binding may be so severe that the self-locking nut may not be turned.

A form of self-locking nut which has been found effective for use with bolts treated by the hot dip galvanized process, is a nut having an anti-reversing pin which projects generally radially inward from the nut for interference engagement with the threads of the bolt. In the manufacture of such anti-reversing nut, the interference pin projects radially into the thread bore; and in use that pin will be deflected in one direction or the other, about 30° from the radial position for example, to assume an anti-reversing position relative to the direction in which the nut is being turned on the bolt. The tip of this pin is configured to be received partially within the groove of the bolt thread and to bite into the bolt material when urged in a reverse direction. The pin, which is anchored in the nut, is necessarily elastic to maintain the interference engagement with the bolt thread and maintain the anti-reversing force, which enables it to perform its function as a self-locking nut.

When it is desired to remove the nut from the bolt, a high torque must be applied which effects the swinging of the anti-reversing pin in the opposite direction about 30° from the radial position, whereby the nut then becomes anti-reversing in the opposite direction.

To provide an effective self-locking nut for a hot dip galvanized bolt it is desirable that the nut be relatively free spinning for either threading the nut onto the bolt, or for unthreading the nut from the bolt after overcoming the high anti-reversing torque. One reason is to minimize any galling or other defacing of the protective coating on the threads which may result in exposure of the base metal and thereby subject the bolt to rust or other corrosion. Another reason is to facilitate the construction of structures being assembled with nuts and bolts and to promote the safety of the workers who may be laboring at high or otherwise hazardous locations. When working at high locations, such as on microwave towers, the use of power tools is sometimes impractical; and a requirement for applying high torque to these fasteners may be hazardous to the workers who must at all times be concerned with body balance and stability.

Anti-reversing nuts of the type described above which are known in the art include an L-shaped anti-reversing pin having an elongated base leg which is anchored in the nut body in parallel relation to the thread axis, and a shorter transverse leg which is directed radially inwardly for interference engagement with the threads of a mating bolt. In the fabrication of these assemblies, the base leg of the pin is rigidly anchored within the nut body, at its end remote from the interference leg; and the above described deflection of the interference leg about 30° to either side of a radial position for example is allowed principally by the torsional deflection of the free portion of the base leg. The elasticity of the materialy from which this anti-reversing pin is made, then, is quite critical. The pin must have the desired elasticity to maintain the interference tip in engagement with the bolt threads with sufficient force to provide the anti-reversing function. If the pin material is not sufficiently elastic, after one or several deflections of the pin interference arm, the pin may break due to over stressing or may be so weak that it can no longer maintain effective anti-reversing force. If the elasticity of the pin material is too low, the pin may simply not apply sufficient force against the bolt threads to function as an anti-reversing pin.

Having in mind that the interference leg of the anti-reversing pin may deflect about 60 degrees between the anti-reversing position for threading the nut onto to the bolt and the anti-reversing position for unthreading the nut, the elastic requirements are high. It would be desirable to provide a lock nut combination of this type having an interference pin which would apply the desired anti-rotation force against the bolt threads, but wherein the tortional deflection required for the locking pin would be much less than the approximately 60 degrees discussed above.

An object of this invention is to provide an improved self-locking nut of the anti-reversing type, and a method for manufacturing same.

Another object of this invention is to provide an improved self-locking nut of the anti-reversing type which is relatively free spinning while running the nut onto or off from a bolt, and a method for manufacturing same.

A further object of this invention is to provide a self-locking nut of the anti-reversing type which is adapted to be used repeatedly without overstressing, and a method for manufacturing same.

Still another object for this invention is to provide an improved self-locking nut of the anti-reversing type having an anti-reversing pin which projects into interference engagement with the bolt and which is adapted to be oscillated between alternative anti-reversing positions, and a method for manufacturing same.

A still further object of this invention is to provide an improved self-locking nut of the anti-reversing type as set forth in the preceding object, where the entire interference pin is allowed to oscillate in a limited manner, thereby minimizing tortional and bending stresses on the interference pin, and a method for manufacturing same.

Another object of this invention is to provide an improved self-locking nut of the anti-reversing type having an anti-reversing pin which projects into interference engagement with the bolt, wherein the interference end of the pin oscillates through a relatively large angle between opposite anti-reversing positions, and where the opposite end of the pin is mounted to oscillate through a lesser angle to reduce stress failure of the anti-reversing pin.

These objects are accomplished in a self-locking nut which includes an annular body having internal threads, the body having a small bore at one side parallel to its axis. An L-shaped anti-reversing pin has one leg disposed within that small bore, and has its other leg extending toward the thread axis for interference engagement with a mating bolt. One leg of the pin has a latching recess disposed adjacent to its free end and facing away from the other leg, with that latching recess being engaged by displaced metal of the nut body which is flowed into the small bore and recess to retain the pin within that bore. In the improved self-locking nut, the latching recess includes two abutment surfaces which are disposed in planes parallel to the longitudinal axis of the one leg and inclined at respective acute angles from a plane which is parallel to that longitudinal axis and perpendicular to the plane defined by the two legs of the pin. The displaced metal of the body is disposed to limit oscillation of the free end of the pin within the small bore through the alternating abutment of the abutment surfaces with the displaced metal, this limited oscillation allowing the swinging of the other arm of the locking pin between alternative anti-reversing positions with resultant reduced stress on the locking pin.

These objects are also accomplished in a method for fabricating a self-locking nut which includes the following steps. An annular nut body is formed having a threaded bore and a small bore at one side parallel to the thread axis. An L-shaped anti-reversing pin is formed from an elongated shaft of an elastic material. A latching recess is formed in one leg of that pin, adjacent to its free end and facing away from the other leg. The latching recess is formed to include two abutment surfaces disposed in planes parallel to the longitudinal axis of the one leg, the abutment surface planes each being inclined at an acute angle to a plane parallel to the longitudinal axis and perpendicular to the plane defined by both legs of the pin. The anti-reversing pin is mounted on the nut body with its one leg confined within the small bore, and with its other leg extending into the threaded bore to interfere with the threads of a mating bolt. Metal of the nut body is flowed or otherwise displaced into the small bore and into the latching recess to latch the pin within that bore, and also in position to be abutted alternately by the two abutment surfaces whereby the free end of the one leg is oscillatable within that bore between limits determined by the engagement of the abutment surfaces with the displaced metal. This oscillation of the free end of the locking pin enables the other arm of the pin to swing from one anti-reversing position to another with reduced elastic stress on the pin.

The novel features and the advantages of the invention, as well as additional objects thereof, will be understood more fully from the following description when read in connection with the accompanying drawings.

DRAWINGS

DESCRIPTION OF THE PREFERRED EMBODIMENT

The drawings illustrate a conventional hex nut which may be fabricated from steel for example, which nut of course includes an annular body 10 having a threaded axial bore 11, and having a hex-shaped periphery for engagement by suitable wrenching tools.

The type of self-locking nut which is the subject of this invention, is particularly suitable for use with nut and bolt assemblies having a protective coating or plating, and is particularly desirable for use with nuts and bolts which are protected by a process known as "hot dip galvanized". While this hot dip galvanized process produces a coating which is not as uniform as electroplating for example, the coating is considered superior to some forms of electroplating from the standpoint of protection against rust and other corrosion. The type of self-locking nut which is the subject of this invention is particularly suited for use with bolts which have been coated by the hot-dip galvanized process, since this type of self-locking nut is less damaging both to itself and to the bolt in conection with the fabrication of the self-locking nut and in connection with the use of the self-locking nut.

Self-locking nuts according to the invention may be fabricated from nuts ranging in thread size from one-half inch to one and one-half inches for example. By way of example, particular reference will be made in this specification to a nut having a one inch thread and having a thread pitch of one-eighthe inch.

To fabricate the self-locking nut according to the invention, an L-shaped anti-reversing or locking pin 20 is assembled with the nut body 10 in the desired relationship. A small bore 13 is drilled through the nut body parallel to the thread axis, to receive one leg of the anti-reversing pin as will be described.

The anti-reversing pin 20 is preferably fabricated from a stainless steel wire or rod having a circular cross section. For the one inch nut mentioned above, the anti-reversing pin would have a diameter of about one-eighth inch.

Figure 2:
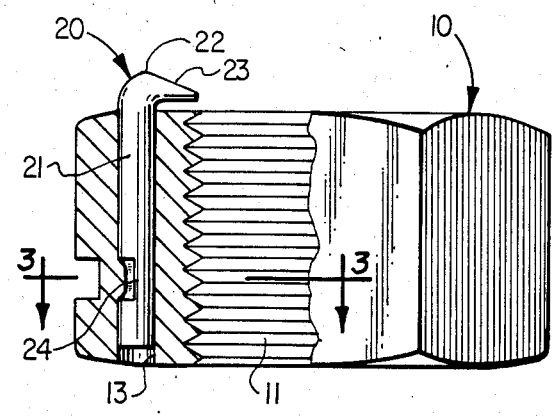
FIG. 2 is a side view, partially in section, of the nut of FIG. 1 illustrating the mounting of the anti-reversing pin.

As best seen in FIG. 2, the anti-reversing pin 20 is fabricated to an L-shape having a longer base leg 21 and a shorter interference leg 22. The base leg is received in the small bore 13, and has a length approximately the same as the thickness of the nut body 10 so that when it is received within the bore 13 it will not project from the opposite end of the bore. The interference leg 22 is of a length to extend into the threaded bore 11, to have the desired interference relation with the threads of a mating bolt as will be described. The tip of the interference leg is provided with a bevel or ground off portion 23 at its exterior face, to reduce the thickness of this tip and allow for some penetration into a thread groove of a mating bolt.

The base leg of the pin is provided with a recess 24 to be described in detail below, which is located near the distal or free end of the base leg and which faces in a direction opposite from the direction of the interference leg 22. This recess then is spaced a substantial distance from the interference leg.

Figure 1:
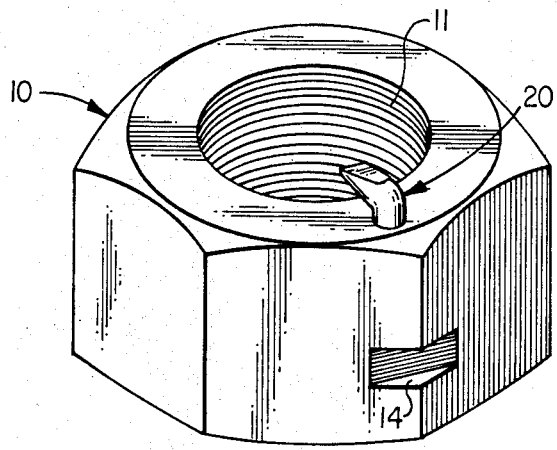
FIG. 1 is a perspective view of a self-locking nut according to the invention.

For the securing of the anti-reversing pin 20 to the nut body 10, the pin may be oriented as illustrated in FIG. 1 with the interference leg aligned radially with the thread axis and projecting into the thread bore, with the recess 24 then facing outwardly relative to the thread axis. To secure the pin to the nut body, the nut is struck with a swage, for example, on its exterior surface in radial alignment with the recess 24, as indicated by the indention 14, to effect the displacement by cold flow of metal of the nut body into the bore 13 and into the pin recess 24. In this manner, the pin base leg 21 is secured against axial movement relative to the nut body.

Figure 4:
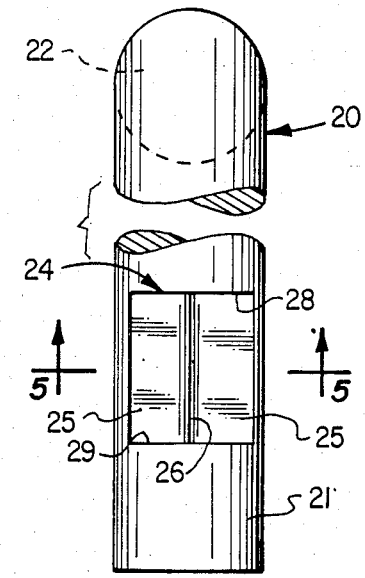
FIG. 4 is a fragmentary side view of the anti-reversing pin, illustrating the latching recess.
Figure 5:
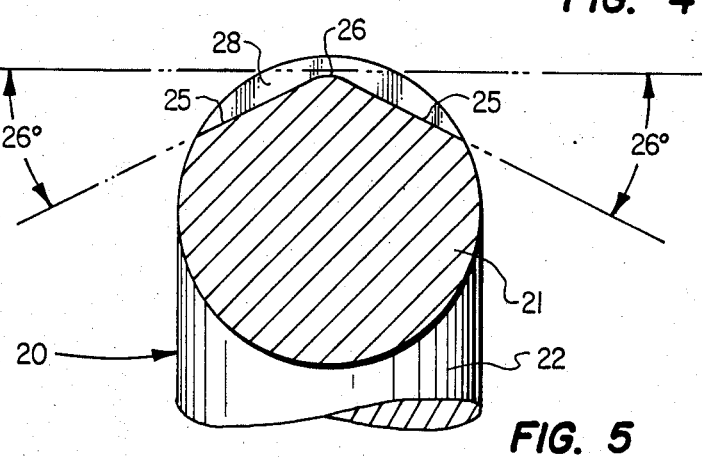
FIG. 5 is a sectional view taken along the line 5—5 of FIG. 4.

The recess 24, as best seen in FIGS. 4 and 5, may appear rectangular as viewed from its face in FIG. 4; and may be formed by the grinding or other forming of two generally planar surfaces 25 which are angled relative to each other forming a longitudinal ridge 26. The surfaces 25 are disposed in planes which are parallel to the axis of the base leg 21 and which, for example are angled about 26° relative to a reference plane indicated by the phantom line 27 in FIG. 5, which reference plane is also parallel to the axis of the base leg 22 and perpendicular to the plane which is defined by the two legs of the anti-reversing pin. The elongated ridge 26, then, is also parallel to the axis of the base leg 21 and, as best seen in FIG. 5, is recessed from the normal surface of the base leg and disposed between upper and lower lips 28 and 29, respectively of the recess 24. The recessing of the ridge 26 assures that the metal of the nut body which is displaced or flowed into the recess 24 will coact with the lips 28 and 29 to prevent relative axial movement of the pin as mentioned above.

Figure 3:
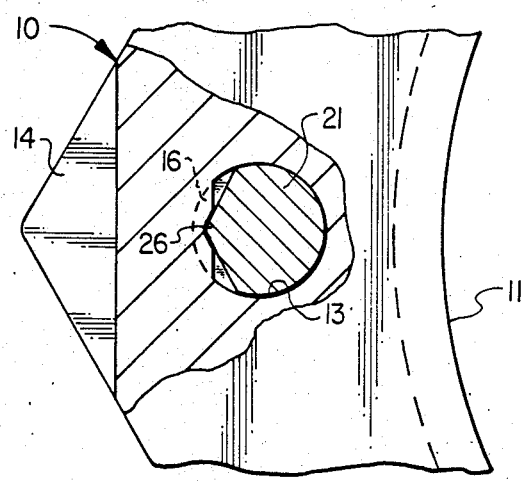
FIG. 3 is a fragmentary top view, partially in section, clearly illustrating the mounting of the anti-reversing pin.

FIG. 3 of the drawing illustrates the relationship of the nut metal 16 which has been displaced into the small bore 13, in relation to the recess 24. FIGS. 1, 2 and 3 illustrate the radial position of the anti-reversing pin 20 relative to the nut 10, wherein the interference leg extends radially into the thread bore 11, and wherein the ridge 26 of the recess faces radially outward relative to the nut. The swage which forms the indention 14 and effects the cold flow of the nut metal would be applied radially toward the thread axis; and the force of the swage would be controlled to displace the metal 16 to the point where it will be abutted by the recess surfaces 25 which are referred to as abuttment surfaces.

It may be desirable that the displaced metal 16 be displaced sufficiently to engage a portion of the longitudinal ridge 26 and also a portion of the immediately adjacent abuttment surfaces 25. This may be desirable so that when the pin is rotated or swung, as will be described, the coaction of the displaced metal 16 and the ridge 26 will provide a resistance to rotation which will tend to maintain the pin in one or the other of the alternative rotated positions to be described. FIG. 3 then illustrates the condition of the nut-anti-reversing pin assembly at the completion of fabrication, and as received by the customer.

Figure 6:
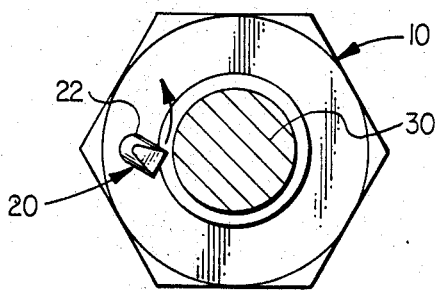
FIG. 6 is an end view of the self-locking nut of FIG. 1 being run onto a bolt in a clockwise direction.

FIG. 6 is a view of a nut bolt assembly, with a bolt 30 being shown in cross-section in the plane of the interference leg 22 of the anti-reversing pin. In the fabrication of the nut 10, the tip of the interference leg will preferably be positioned relative to the nut threads, to be received within the groove of the thread of the mating bolt; and this tip will be spaced slightly from the end face of the nut. The nut is threaded onto the bolt from its face opposite from that carrying the interference leg, so that the nut threads will be substantially fully engaged with the bolt threads when the anti-reversing pin first comes in contact with the bolt threads.

Figure 7:
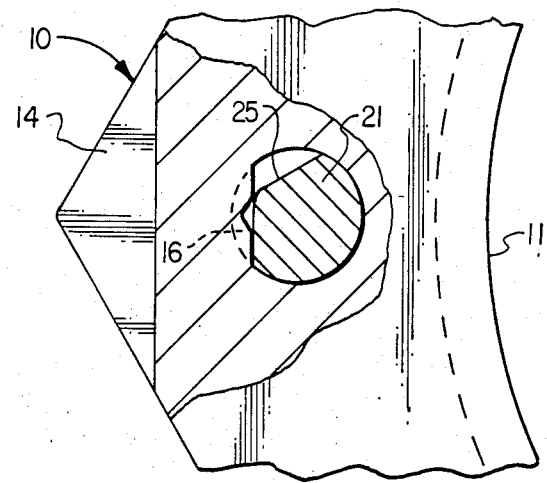
FIG. 7 is a fragmentary top view of the nut, partially in section to illustrate the position of the pin latching recess corresponding to the FIG. 6 pin position.

Because of the precalculated interference relationship, the interference tip will necessarily be deflected by the bolt away from the radial position illustrated in FIGS. 1, 2 and 3 to a position 30° or more from that radial position. With the design parameters described here, by way of exmaple, that deflection of the interference leg should be at least 30°. FIG. 7 of the drawing is related to FIG. 6, and illustrates the position of the distal end of the base leg 21 when the interference leg 22 is deflected as in FIG. 6. It will be seen from FIG. 3 that the displaced metal 16 presents an abuttment surface which is disposed generally in a plane parallel to the reference plane 27 illustrated in FIG. 4 so that one of the recess surfaces 25 moves to a plane parallel to that reference plane. This means that the distal end of the anti-reversing pin will have swung or rotated about 26° from the radial position while the interference leg has swung at least 30°. The difference in rotational swing of the interference leg end and the recess end of the pin 20 is at least 4°; and this is absorbed by the elasticity of the pin material. This allows for a relatively small degree of twist or tortion of the base leg; so that the pin may be fabricated from a material which is elastically quite stiff and this relatively low degree of tortion will maintain the interference tip in engagement with the bolt thread with sufficient force to perform the anti-reversing function of the self-locking nut. Because the amount of elastic tortion required is small, the pin may be fabricated from a wide range of materials.

FIG. 6 illustrates the condition of the nut-bolt assembly having right hand threads, with the nut being turned in a clockwise direction relative to the bolt to thread the nut onto the bolt. Because of the deflection of the interference leg with the accompanying limited rotation of the free end of the base leg, in the manner illustrated, the nut will be quite free spinning on the bolt and may be run onto the bolt quite easily possibly by hand or at least using nothing more substantial than a light weight hand wrench. It will be seen that one corner of the tip of the interference leg is engaged in the groove of the bolt thread; and should an attempt be made to reverse the nut on the bolt, this corner will bite into the bolt material or the coating applied to the bolt and prevent reverse rotation unless a significant amount of torque is applied.

Figure 8:
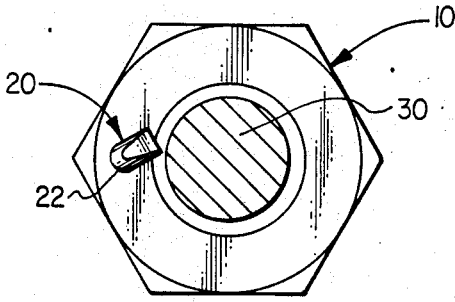
FIG. 8 is a view similar to FIG. 6 of the self-locking nut of FIG. 1 being run off a bolt in a counterclockwise direction.
Figure 9:
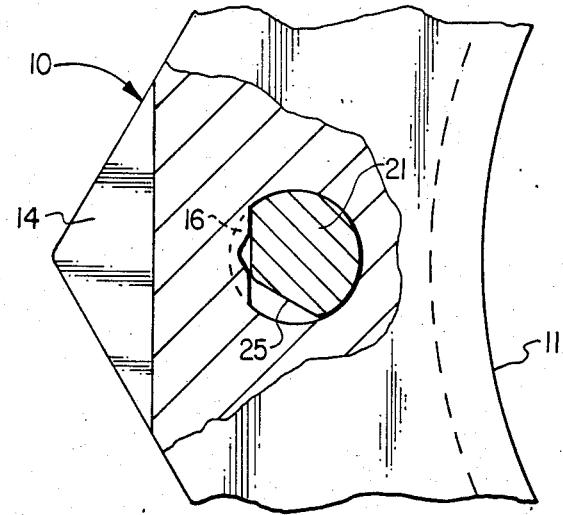
FIG. 9 is a view similar to FIG. 7 illustrating the position of the pin latching recess corresponding to the FIG. 8 pin position.

Should it be desired to back the nut off the bolt, that is to rotate the nut in a counterclockwise direction, it will be necessary to apply that substantial amount of torque to the nut to cause the interference leg 21 to swing or oscillate from the FIG. 6 position to the position illustrated in FIG. 8. The relative dimensions of the nut and bolt, the anti-reversing pin, and the bore 13 are such to permit this swinging. The swinging is further resisted by the designed interference between the recess ridge 26 and the displaced nut metal 16. Once the interference arm has been swung and is now deflected in the opposite direction as illustrated in FIG. 8, with the free end of the base leg being rotated to a more limited extent as illustrated in the companion FIG. 9, the torsion condition of the anti-reversing pin will be the same as that described above and the torque required to further unthread the nut from the bolt will again be quite small so that the nut may possibly be removed from the bolt by hand or with a light wrench.

With the nut being very free spinning when being run onto or off from the bolt as described, there is minimal galling or damage to the surfaces of the bolt threads which might tend to interfere with the protective coating and allow rust or other corrosion of the bolt threads to occur. Yet, the nut is very effective as a self-locking nut. This self-locking nut then is very effective for use with bolts having a protective coating or plating, and particularly for a bolt coated by the hot dip galvanized process where the thickness of the coating may not be uniform. Because of the elasticity of the anti-reversing pin, the pin will readily accommodate irregularities of the bolt thread surface.

When a nut which has been used is removed from a bolt, the anti-reversing pin will remain in the last deflected position (the position illustrated in FIG. 8 for a right hand threaded nut). This position will be maintained because of the interference relationship of the recess ridge 26 and the displaced nut metal 16. This being the case, the deflected interference pin will provide a visual indication that a particular nut has been used, as opposed to the visual indication of a new or unused nut provided by the radial position of the anti-reversing pin. This visual indication may be useful to structural workers when unused and used nuts have been intermingled.

What has been described are a unique self-locking nut and a unique method for fabricating a self-locking nut of the type having an anti-reversing pin. A particular feature and advantage of the invention is that the self-locking nut is suitable for use with all types of bolts; and is particularly suitable for use with bolts having a protective coating applied by the hot dip galvanized method. Because the range of tortional elasticity required for the anti-reversing pin is small, that pin may be fabricated from a wide range of materials providing a wide range of anti-rotation forces for use with many different types of bolts.

Another important feature and advantage of the invention is that because the required range of tortion or twisting of the anti-reversing pin is small, the stess forces applied to the pin are limited. This means that the antireversing pins are not liable to breakage or overstressing so that breakage of pins is drastically reduced. More importantly, these nuts may be used repeatedly without the concern that, because of possible overstressing, used nuts may not continue to apply the required anti-reversing force against the bolt threads. In other words, the self-locking nuts remain reliable for repeated uses.

Another important feature and advantage is that while the nuts are effective to maintain the anti-reversing force against the bolt threads, yet the nuts are quite free spinning on the bolts during the running of the nut onto the bolt or the running of the nut off from the bolt, thereby minimizing the manual work involved which may prevent hazards to workers at above ground work locations.

While the preferred embodiment of the invention has been illustrated and described, it will be understood by those skilled in the art that changes and modifications may be resorted to without departing from the spirit and scope of the invention.

What is claimed is:

1. In a self-locking nut which includes: an annular body having internal threads; said body having a small bore at one side parallel to the thread axis thereof; an L-shaped anti-reversing pin fabricated from an elastic material, having one leg disposed within said small bore and having its other leg extending generally radially from said bore toward said thread axis for interference engagement with a mating bolt; said one leg having a latching recess disposed adjacent to its free end and facing away from said other leg; said latching recess being engaged by displaced metal of said nut body flowed into said small bore to retain said pin within said bore; the improvement comprising said latching recess including two contiguous abutment surfaces disposed in intersecting planes parallel to the longitudinal axis of said one leg and inclined at respective selected acute angles from a reference plane parallel to said longitudinal axis and perpendicular to the plane defined by the legs of said pin;

said displaced metal of said body being disposed within said recess to limit oscillation of said free end of said one leg within said small bore through the alternating abutting of said two abutment surfaces with said displaced metal, to allow swinging of said other leg of said locking pin between alternative anti-reversing positions with resultant reduced stress on said locking pin.

2. A self-locking nut as set forth in claim 1 including said abutment surfaces comprising planar surfaces forming said ridge.

3. A self-locking nut as set forth in claim 1 including said abutment surfaces being inclined at a relatively small acute angle from said reference plane.

4. A self-locking nut as set forth in claim 1 including said abutment surfaces being inclined at an angle of about 26° relative to said reference plane.

5. A self-locking nut as set forth in claim 1 including said abutment surfaces and said displaced metal limiting the oscillation of said free end of said one leg to a preselected angle, whereby the swinging of said other leg through a greater angle is permitted with minimum tortional stress on said one leg.

6. A self-locking nut as set forth in claim 1 including said displaced metal presenting a generally planar abutment surface disposed to be engaged by said abutment surfaces of said pin.

7. In a self-locking nut which includes: an annular body having internal threads; said body having a small bore at one side parallel to the thread axis thereof; an L-shaped anti-reversing pin fabricated from an elastic material, having one leg disposed within said small bore and having its other leg extending generally radially from said bore toward said thread axis for interference engagement with a mating bolt;said one leg having a latching recess disposed adjacent to its free end and facing away from said other leg; said latching recess being engaged by displaced metal of said nut body flowed into said small bore to retain said pin within said bore; the improvement comprising:

said latching recess including two abutment surfaces forming a ridge facing away from said other leg, said abutment surfaces being disposed in planes parallel to the longitudinal axis of said one leg and inclined at respective selected acute angles from a reference plane parallel to said longitudinal axis and perpendicular to the plane defined by the legs of said pin;

said displaced metal of said body being disposed within said recess to limit oscillation of said free end of said one leg within said small bore through the alternating abutting of said two abutment surfaces with said displaced metal, to allow swinging of said other leg of said locking pin between alternative anti-reversing positions with resultant reduced stress of said locking pin and to engage said ridge in the radial position of said locking pin to provide a resistance to oscillation of said pin between alternative anti-reversing positions.

8. A method for fabricating a self-locking nut including the steps forming, in an annular nut body having a threaded bore, a small bore at one side thereof parallel to the thread axis of said threaded bore;

forming an L-shaped anti-reversing pin from an elongated shaft of an elastic material;

forming a latching recess in one leg of said pin, adjacent to the free end thereof and facing away from the other leg thereof;

forming said latching recess to include two contiguous abutment surfaces disposed in intersecting planes parallel to the longitudinal axis of said one leg, said abutment planes each being inclined at a selected acute angle away from a reference plane parallel to said longitudinal axis and perpendicular to the plane defined by both legs of said pin;

mounting said anti-reversing pin on said nut body with said one leg of said pin confined within said small bore, and with the other leg of said pin extending generally radially into said threaded bore to interfere with the threads of a mating bolt;

and displacing metal of said nut into said small bore and into said recess to latch said pin within said bore, and to be abutted alternately by said two abutment surfaces;

said free end of said one leg being thereby oscillatable within said small bore through a limited angle determined by the abutment of said abutment surfaces with said displaced metal; said oscillation of said free end of said pin enabling said other arm thereof to swing through a greater angle from one anti-reversing position to another with reduced elastic stress on said pin.

9. A method as set forth in claim 8 including the step forming said abutment surfaces as planar surfaces defining an elongated ridge.

10. A method as set forth in claim 8 including the step forming said abutment surfaces of said pin at a relatively small acute angle relative to said reference plane.

11. A method as set forth in claim 8 including the step forming said abutment surfaces of said pin at an angle of about 26° relative to said reference plane.

12. A method as set forth in claim 8 including the step forming said displaced metal to present a generally planar abutment surface to be engaged by said abutment surfaces of said pin.

13. A method for fabricating a self-locking nut including the steps of:

forming, in an annular nut body having a threaded bore, a small bore at one side thereof parallel to the thread axis of said threaded bore;

forming an L-shaped anti-reversing pin from an elongated shaft of an elastic material;

forming a latching recess in one leg of said pin, adjacent to the free end thereof and facing away from the other leg thereof;

forming said latching recess to include two abutment surfaces disposed in planes parallel to the longitudinal axis of said one leg and separated by an intervening ridge, said abutment planes each being inclined at a selected acute angle away from a reference plane parallel to said longitudinal axis and perpendicular to the plane defined by both legs of said pin;

mounting said anti-reversing pin on said nut body with said one leg of said pin confined within said small bore, and with the other leg of said pin extending generally radially into said threaded bore to interfere with the threads of a mating bolt;

and displacing metal of said nut into said small bore and into said recess into engagement with said ridge to latch said pin within said bore, and to be abutted alternately by said two abutment surfaces;

said free end of said one leg being thereby oscillatable within said small bore through a limited angle determined by the abutment of said abutment surfaces with said displaced metal; said oscillation of said free end of said pin enabling said other arm thereof to swing through a greater angle from one anti-reversing position to another with reduced elastic stress on said pin while oscillation of said locking pin between alternative anti-reversing positions is resisted by engagement of said displaced metal with said ridge.

* * * * *